United States Patent
Schwarz

(10) Patent No.: US 6,701,914 B2
(45) Date of Patent: Mar. 9, 2004

(54) INSTALLATION FOR STORING THERMAL ENERGY

(75) Inventor: Alois Schwarz, Kirchdorf/Tirol (AT)

(73) Assignee: ERI Forschungs-Und Entwicklungs-AG, Woergl (AT)

( * ) Notice: Subject to any disclaimer, the term of this patent is extended or adjusted under 35 U.S.C. 154(b) by 0 days.

(21) Appl. No.: 10/223,513

(22) Filed: Aug. 19, 2002

(65) Prior Publication Data

US 2003/0000680 A1 Jan. 2, 2003

Related U.S. Application Data

(63) Continuation of application No. PCT/AT01/00028, filed on Feb. 6, 2001.

(30) Foreign Application Priority Data

Feb. 7, 2000 (AT) ............................................. 238/2000

(51) Int. Cl.[7] .................................................. F24H 7/00
(52) U.S. Cl. ........................ 126/400; 126/612; 126/617; 126/642; 165/10
(58) Field of Search ................................ 126/400, 609, 126/610, 612, 617, 620, 641, 646, 684, 611, 634, 642; 165/10, 104.11, 104.31

(56) References Cited

U.S. PATENT DOCUMENTS

| | | | | | |
|---|---|---|---|---|---|
| 4,008,709 A | * | 2/1977 | Jardine | ........................ | 126/610 |
| 4,063,546 A | | 12/1977 | Schmid et al. | .............. | 126/400 |
| 4,182,409 A | * | 1/1980 | Robinson, Jr. | .............. | 126/400 |
| 4,194,496 A | * | 3/1980 | Carlson | ...................... | 126/620 |
| 4,397,152 A | * | 8/1983 | Smith | .......................... | 126/620 |
| 4,524,756 A | * | 6/1985 | Laverman | .................... | 126/400 |
| 4,544,028 A | * | 10/1985 | Chase | .......................... | 126/400 |

FOREIGN PATENT DOCUMENTS

| | | | | |
|---|---|---|---|---|
| DE | 29 48 417 A1 | 6/1981 | | |
| DE | 32 24 854 A1 | 1/1984 | | |
| JP | 8-21655 A | * | 1/1996 | ............. F24H/7/00 |

* cited by examiner

*Primary Examiner*—Josiah Cocks
(74) *Attorney, Agent, or Firm*—Laurence A. Greenberg; Werner H. Stemer; Gregory L. Mayback

(57) ABSTRACT

The installation stores thermal energy, i.e., heat energy and/or cold energy. A plurality of conduits are laid underground. Several regions that are arranged one inside the other and contain energy-saving material and conduits respectively are provided. The conduits that are arranged in the individual areas can be connected to users having different temperature levels. The innermost region is maintained at a highest temperature differential relative to the outside of the installation and the innermost region can be connected, inter alia, to drive an electrical generator.

6 Claims, 1 Drawing Sheet

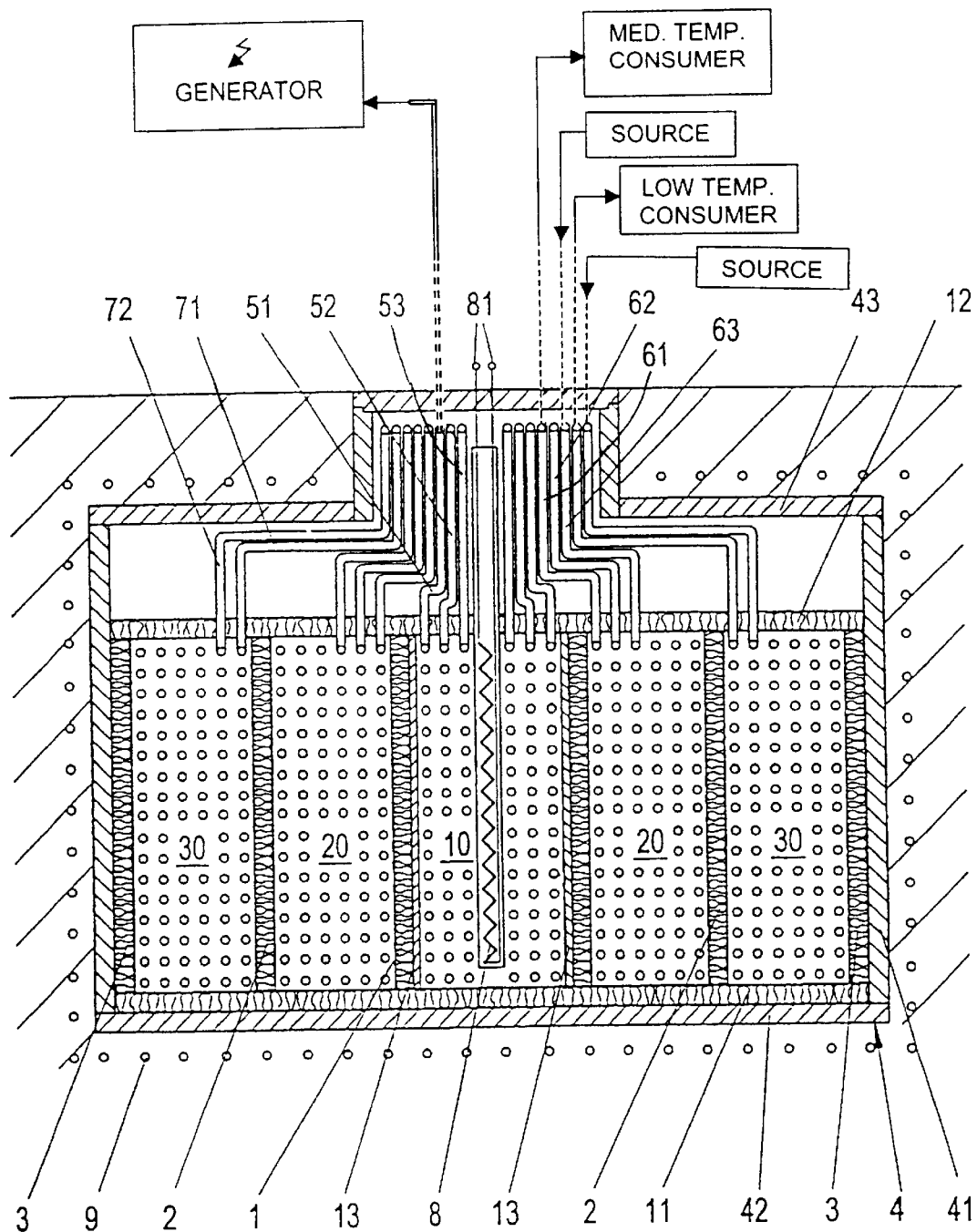

US 6,701,914 B2

INSTALLATION FOR STORING THERMAL ENERGY

CROSS-REFERENCE TO RELATED APPLICATION

This application is a continuation of copending International Application No. PCT/AT01/00028, filed Feb. 6, 2001, which designated the United States and which was not published in English.

BACKGROUND OF THE INVENTION

Field of the Invention

The invention lies in the field of applied thermodynamics. More specifically, the present invention relates to an installation for storing thermal energy, i.e., heat energy or cold energy, having pipelines located in the ground.

It is known to lay in the ground pipelines through which a carrier medium for heat energy or for cold energy is conducted. The earth surrounding the pipelines thereby serves as a thermal store. Prior art plants of this type do not satisfy the requirements, since thermal energy overflows into the ground and flows out of the latter, with the result that it is lost.

SUMMARY OF THE INVENTION

It is accordingly an object of the invention to provide an installation for storing heat energy or cold energy, which overcomes the above-mentioned disadvantages of the heretofore-known devices and methods of this general type and which is designed in such a way that thermal energy stored in it can be recovered virtually completely and be supplied for use to consumers.

With the foregoing and other objects in view there is provided, in accordance with the invention, an installation for storing thermal energy, comprising:

- a plurality of mutually concentric, individual regions each containing energy-storing material and including an innermost region, and at least one outer region;
- a plurality of conduits laid in said individual regions and adapted to be connected to consumers at mutually different temperature levels;
- an electric heating device disposed to heat said innermost region;
- at least one pipe coil in said innermost region for connection to an energy source;
- wherein the innermost region is configured to store heat energy with temperatures of between 100° C. and 500° C., and at least one of the conduits is guided out of the innermost region and connected to operate an electric generator.

In other words, the objects of the invention are achieved in that a plurality of regions are provided which are arranged one in the other and each contain energy-storing material and pipelines and which are insulated relative to the outside, the pipelines arranged in the individual regions being connectable to consumers or to generators of energy with different temperature levels.

Preferably, these regions are of cylindrical or hollow-cylindrical design, and they are arranged concentrically to one another. According to further preferred features, the innermost region is designed with an electric heating device and/or with at least one pipeline for connection to a collector for environmental energy. In this case, in particular, the innermost region is provided for the storage of heat energy with a temperature of between 100° C. and 500° C., the region located outside said innermost region is provided for the storage of energy with a temperature of 80° C. to 50° C., and the region surrounding the latter region is provided for the storage of heat energy with a temperature of 50° C. to 25° C.

In accordance with a concomitant feature of the invention, a reflector is provided on the inside of at least one of the regions. Furthermore, the plant may be formed by a vessel which is manufactured in a way known per se from concrete and in which the pipelines are arranged.

Other features which are considered as characteristic for the invention are set forth in the appended claims.

Although the invention is illustrated and described herein as embodied in an installation for storing heat energy or cold energy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The FIGURE is a diagrammatic view of a plant according to the invention in vertical section.

DESCRIPTION OF THE PREFERRED EMBODIMENTS

Referring now to the sole figure of the drawing in detail, there is illustrated an installation for storing thermal energy that is located in the ground. The installation or plant has an inner first wall 1, also a second wall 2 located outside the first wall 1 and, outside the second wall 2, a third wall 3. The three walls 1, 2 and 3 define three regions 10, 20 and 30 which are in each case located one inside the other and are filled with a material which has a very high thermal storage effect. The storage material may be formed, for example, by concrete or clay.

All these walls 1, 2 and 3 are produced from thermally insulating material. Moreover, a bottom plate 11 and a cover plate 12, which are likewise produced from thermally insulating material, are provided, by means of which the regions 10, 20 and 30 are closed off upwardly and downwardly. Furthermore, a thermal reflector 13 is provided on the inside of the wall 1. Moreover, these walls 1, 2 and 3 may be located within a vessel 4 which is produced, for example, from reinforced concrete and likewise has a jacket 41 and which is designed with a bottom plate 42 and with a cover plate 43. Outside the vessel 4 there is located a further pipeline 9 of a ground collector or earth collector.

A plurality of pipelines located respectively in the regions 10, 20 and 30. The pipelines 51, 52, 53, 61, 62, 63, 71 and 72 are surrounded by the storage material and their connections are led out of the regions 10, 20 and 30. Finally, the region 10 has located in it at least one heating device which is formed by an electric heater 8, by an environmental collector connected to one of the pipelines 51, 52, 53, and/or by another generator for heat energy. The heater 8 is connected via an electrical line 81 to photovoltaic elements or to a line for excess electrical energy. A heat carrier or cold carrier, such as glycol or oil, may be conducted through the pipelines.

A number of boxes with descriptive labels are diagrammatically illustrated above ground. The devices and connections associated with these boxes will become clear from the following description of the operation of the plant:

By means of the at least one heating device 8 located in the innermost region 10 and/or by means of a further generator of heat energy, the region 10 is heated to a temperature of 100° C. to 500° C., the energy being stored in this region 10. Heat energy with a very high temperature is thereby available, which may be transmitted to a consumer that requires a supply of high temperature. This energy is used for operating an electric generator, for example via the line 51 which is led out. In addition, a heating boiler, a hot-water generator, a baking oven and the like may also be fed with this energy content.

Heat energy which flows out of the innermost region 10 radially outward, passes into the region 20, which surrounds this region 10 and in which is located a heat carrier having a temperature of 50° C. to 100° C. Via the pipelines 61, 62, 63 located in this region 20, medium is transmitted to a second group of consumers, such as a hot-water generation system, a heating system, or the like. Located in the third region 30 surrounding the second region 20 is a heat carrier with a temperature of 25° C. to 50° C. which is transmitted via the pipelines 71 and 72 to a third group of consumers having a lower temperature requirement.

However, not only is heat energy extracted from the regions 10, 20 and 30, but heat energy may also be fed into all these regions. There are therefore three regions with different temperature levels, from which in each case heat energy with that temperature which is required for the respective consumers can be extracted and into which heat energy in each case with that temperature level which is required by generators of heat energy is likewise fed.

The sources or generators of heat energy are in this case photovoltaic elements, heat collectors, heat pumps, plants from which waste heat is discharged, heat pumps and the like. It is critical, in this context, that the available heat energy is always fed into that region or extracted from that region which has the corresponding temperature level. Moreover, for example, electrical energy may be converted into thermal energy and stored.

Since the individual regions with different temperature levels are arranged one inside the other, heat energy flowing out of the innermost region 10 is not lost, but passes into the outer region 20 surrounding the innermost region. This likewise applies to heat energy flowing out of the region 20 into the region 30. An outflow of energy from the innermost region 10 is largely avoided by means of the reflector 13.

Insofar as a large plant is concerned, this may be made in the ground by the walls 1, 2 and 3 being produced for the regions 10, 20 and 30. In the case of smaller plants, these walls may be arranged in the vessel 4 which is set in the ground.

A plant of this type may also be used in a similar way for the storage of cold energy.

I claim:

1. An installation for storing thermal energy, comprising:
   a plurality of mutually concentric, individual regions each containing energy-storing material and including an innermost region, and at least one outer region, said individual regions storing energy at mutually different temperature levels;
   a plurality of conduits laid in said individual regions and adapted to be connected to consumers at mutually different temperature levels;
   an electric heating device disposed to heat said innermost region;
   at least one pipe coil in said innermost region for connection to an energy source for heating said innermost region;
   said innermost region being configured to store heat energy with temperatures of between 100° and 500°, and one line of said conduits being guided out of said innermost region to operate an electric generator.

2. The installation according to claim 1, wherein said conduits and said regions are disposed underground.

3. The installation according to claim 1, wherein said energy source connected to said at least one pipe coil is a source selected from the group consisting of a collector for environmental energy, a heat pump, and a heat system.

4. The installation according to claim 1, wherein said individual regions are separated by walls and a reflector is disposed on an inside surface of said wall surrounding said innermost region.

5. The installation according to claim 1, wherein said at least one outer region includes a second region outside said innermost region and configured to store energy at temperatures of 100° C. to 50° C. and a third region outside said second region and configured to store energy at temperatures of 50° C. to 25° C.

6. The installation according to claim 1, wherein said regions are defined in a vessel, and said regions are arranged one inside the other and having storage materials and conduits, and said conduits are adapted for respective connection to generators and consumers with mutually different temperature levels.

* * * * *

UNITED STATES PATENT AND TRADEMARK OFFICE
CERTIFICATE OF CORRECTION

PATENT NO. : 6,701,914 B2  
DATED : March 9, 2004  
INVENTOR(S) : Alois Schwarz

It is certified that error appears in the above-identified patent and that said Letters Patent is hereby corrected as shown below:

<u>Title page,</u>  
Item [73], Assignee, should be left blank. No assignee should be listed.

Signed and Sealed this

Eighth Day of June, 2004

JON W. DUDAS  
*Acting Director of the United States Patent and Trademark Office*